(No Model.) 2 Sheets—Sheet 1.
J. E. TOOLE.
CONDUIT ELECTRIC RAILWAY.
No. 527,301. Patented Oct. 9, 1894.
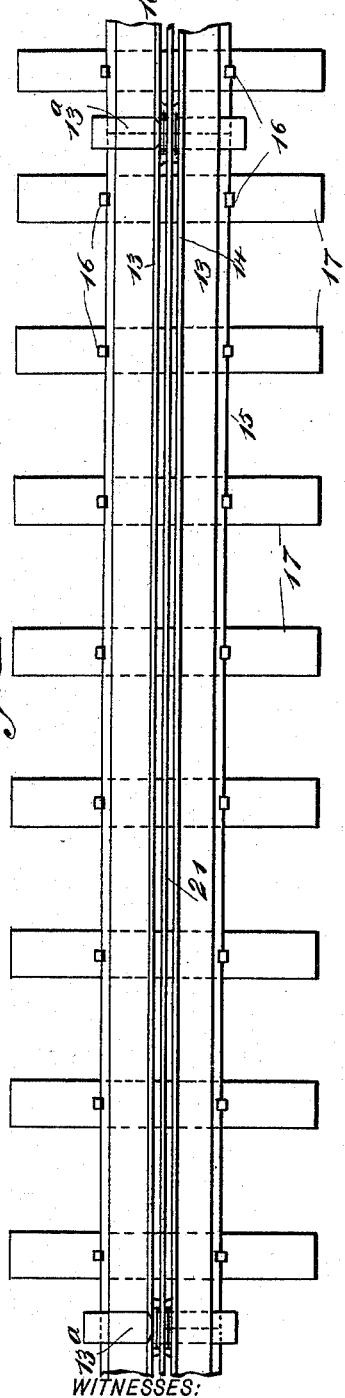
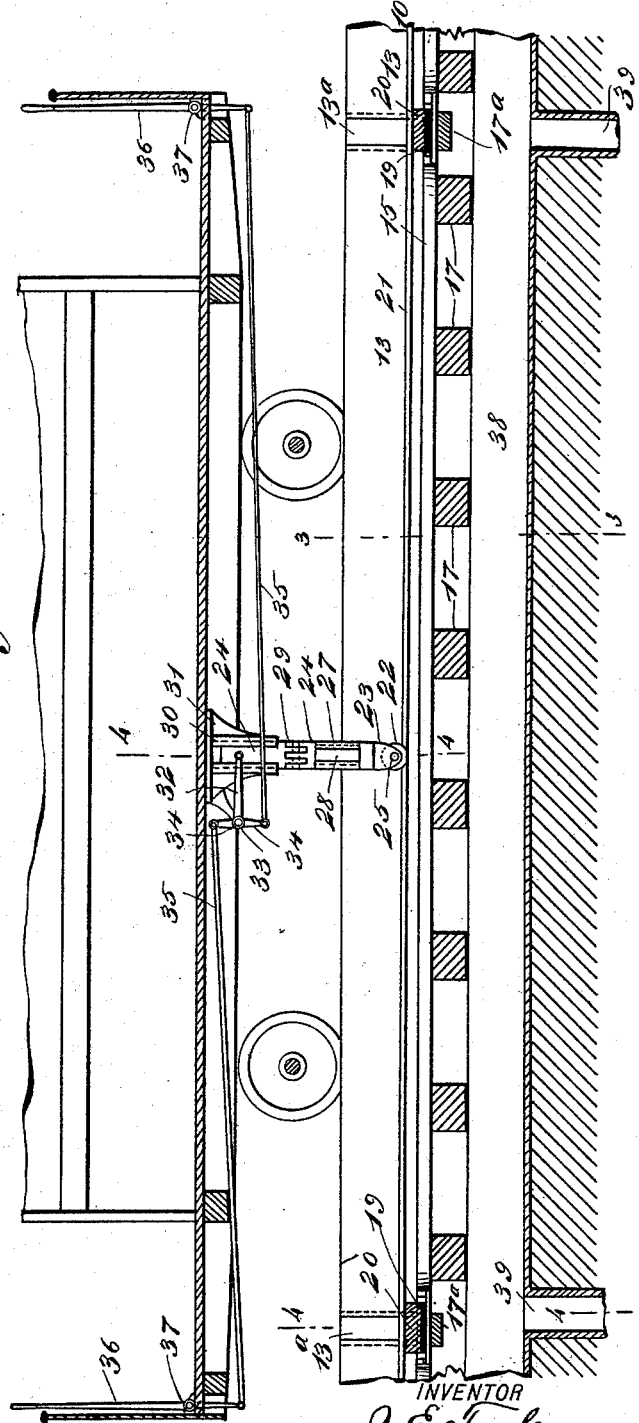
WITNESSES:
C. Neveux
A. Luscott
INVENTOR
J. E. Toole
BY
Munn & Co.
ATTORNEYS.

(No Model.) 2 Sheets—Sheet 2.
J. E. TOOLE.
CONDUIT ELECTRIC RAILWAY.
No. 527,301. Patented Oct. 9, 1894.
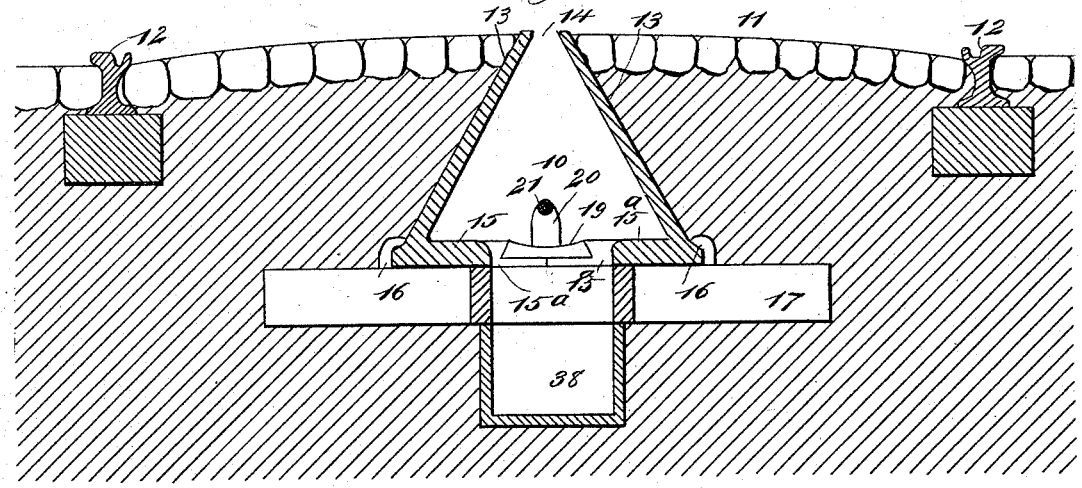
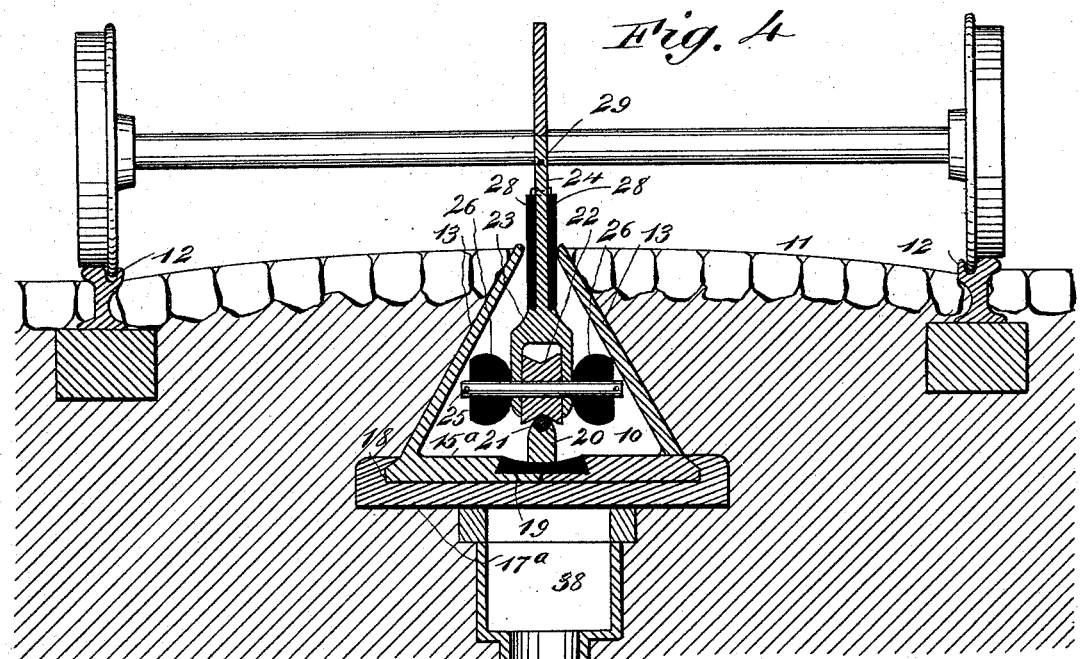
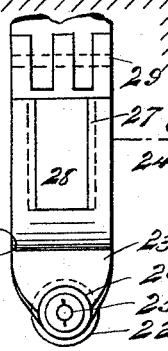
WITNESSES:
C. Neveux
A. Luicott
INVENTOR
J. E. Toole
BY
Munn &Co
ATTORNEYS.
THE NORRIS PETERS CO., PHOTO-LITHO., WASHINGTON, D. C.

UNITED STATES PATENT OFFICE.

JAMES E. TOOLE, OF NORTHUMBERLAND, PENNSYLVANIA.

CONDUIT ELECTRIC RAILWAY.

SPECIFICATION forming part of Letters Patent No. 527,301, dated October 9, 1894.

Application filed January 24, 1894. Serial No. 497,857. (No model.)

*To all whom it may concern:*

Be it known that I, JAMES E. TOOLE, of Northumberland, in the county of Northumberland and State of Pennsylvania, have invented a new and Improved Conduit Electric Railway, of which the following is a full, clear, and exact description.

My invention relates to improvements in that class of electric railways in which the line wire is carried in an underground conduit, contact being made with the wire by means of a trolley, the arm of which extends through a slot in the conduit top.

The object of my invention is to produce a very simple and inexpensive railway of this kind in which the conduit is exceptionally strong as well as cheap, which has perfect means for draining the conduit, and which is provided with a trolley hung in such a manner that it may pass easily around curves, which has means for guiding the trolley wheel on the line wire, and which has means for conveniently raising the trolley whenever it is desired to break the circuit.

A further object of my invention is to construct the trolley in a simple and substantial manner, and to arrange it in such a way that it is perfectly insulated so that there is no danger of grounding the circuit.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken plan view of the conduit embodying my invention. Fig. 2 is a broken longitudinal section of the conduit and of a car provided with a trolley extending downward into the conduit. Fig. 3 is an enlarged cross section on the line 3—3 of Fig. 2. Fig. 4 is an enlarged cross section through the conduit and trolley on the line 4—4 of Fig. 2. Fig. 5 is a detail side elevation of the lower portion of the trolley; and Fig. 6 is a sectional plan, on the line 6—6 of Fig. 1, of the trolley.

The railway is provided with a conduit 10 which, in cross section, is of a generally triangular shape and is arranged in the customary manner beneath the center of the roadbed 11 and between the track rails 12. The conduit is provided with sides 13 which converge upward almost meeting at the top, the upper edges being separated by the slot 14 which is flush with the roadbed and through which the trolley arm extends. The sides of the trolley merge in a suitable base 15 which is split longitudinally and is divided at intervals with inwardly-extending ribs 15ª which abut, the remaining portion of the conduit being open in the center, as shown clearly in Fig. 3, so as to provide for a perfect drainage, as hereinafter described.

The conduit is made up in sections with the ribs 15ª at the ends of the sections, and the conduit is held in place by spikes 16 which clamp the edges of the base and extend into sleepers 17 on which the conduit rests. The ends of the several conduit sections are dovetailed, as shown at 18 in Fig. 4, in clamping plates 17ª which clasp the meeting edges of the conduit sections and thus hold them together. At these points the sides of the conduit are also provided with removable slides 13ª, which may be pulled out at the top so that easy access may be had to the conduit.

The ribs 15ª are dovetailed at their inner ends to receive the insulators 19, which may thus be slipped easily to place, and the insulators have uprights 20 thereon which support the line wire 21, this running longitudinally through the entire length of the conduit and being charged in the customary manner. On the wire 21 runs the trolley wheel 22 which is of conducting material and is journaled in the fulcrumed lower end 23 of the trolley arm 24, the trolley wheel being journaled on an axle 25 which projects outward through the sides of the trolley arm and carries at its ends nearly spherical insulating wheels 26, these being flattened at their outer sides and they serve to guide the trolley wheel, as in case the trolley swings either way one of the insulating wheels strikes the side of the conduit. As the wheels are of insulating material, they prevent any grounding of the circuit when they touch the conduit.

The trolley arm 24 is provided on opposite sides and at points near the slot 14 with slideways 27, in which are held removable slides or wear plates 28, of insulating material, these being convex on their outer sides so that, in case of any lateral movement of the trolley arm, they come in contact with the edges of the conduit so as to prevent any current from escaping from the arm, which is of conducting material. The trolley arm is hinged at a point above the conduit, as shown at 29, so that it may bend laterally, and this enables the car to pass around a curve or upon a siding without seriously disturbing the trolley.

The trolley arm 24 may be supported on the car in any convenient manner, a preferred way being illustrated in Fig. 2, where the upper end of the arm is shown in a slideway 30 of a bracket 31 which is secured beneath the car, and the trolley arm is pivoted to a crank 32 of a shaft 33 which has oppositely arranged cranks 34 connecting with rods 35 leading to the ends of the car, where each rod is pivoted to the lower end of a lever 36 which is fulcrumed on the car platform, as shown at 37, and thus by tilting the lever the rod may be moved longitudinally, the shaft 33 turned, and the crank 32 moved so as to raise or lower the trolley arm and trolley. The trolley arm is as stated above of conducting material, and the motor wires may be connected with it in any convenient manner.

As remarked in the early part of the specification, the conduit is open at the bottom throughout the greater part of its length, and extending longitudinally beneath the center of the conduit and the whole length of it is a trough 38, which collects all the water passing downward through the conduit, and this trough has, at frequent intervals, pipes 39 adapted to connect with a sewer or other place of discharge.

From the above description it will be seen that the conduit and trolley are both very simple and strong, and that consequently a complete railway may be constructed on this principle at a comparatively small cost.

Having thus described my invention, I claim as new and desire to secure by Letters Patent—

1. In a conduit electric railway, the conduit composed of two similar parts, each having an inwardly-extending base and an inclined side, the inwardly extending base portions being spaced apart to form a drainage slot and provided at intervals with ribs which cross said slot substantially as described.

2. The conduit having a suitable base split longitudinally through a greater part of its length, the edges of the base portions at the split being spaced apart to form a drainage slot, ribs crossing the slot and forming insulator supports and inclined sides converging upward, substantially as described.

3. The conduit, comprising a series of sections abutting end to end and of a generally triangular shape, and the clamping pieces dovetailed upon the abutting portions of the sections, substantially as described.

4. The combination, with the conduit having the slotted bottom and the meeting ribs, of the insulators dovetailed into the ribs and adapted to carry the line wire, substantially as described.

5. The combination, with the conduit and the line wire therein, of the trolley consisting of a conducting arm, a wheel journaled in the arm to run on the wire, and guide wheels on the sides of the trolley, the guide wheels being of insulating material, substantially as described.

6. The combination, with the conduit and the line wire therein, of the trolley comprising a hinged arm extending through the conduit slot, a trolley wheel journaled in the arm and adapted to run on the wire, and insulated guide wheels on opposite sides of the trolley, substantially as described.

7. The trolley comprising the arm having slide ways in its opposite sides, insulating slides mounted in said slide ways, and the trolley wheel on the lower end of the arm, substantially as herein described.

8. The sectional electric conduit composed of a series of abutting sections each formed of two similar parts having inclined sides and base portions provided at the ends of their inner edges with ribs spacing said edges apart and also forming supports for the line wire, and the slides 13$^a$ mounted on the abutting ends of the sections, substantially as shown and described.

9. An electric conduit comprising the two similarly formed parts, each having an inclined side piece spaced apart to admit the trolley arm, and base sections spaced apart to form a drainage slot, and provided with abutting ribs, clamps securing the said two parts together, sleepers on which said connected members rest, and a trough or water channel below the sleepers and conduit, and having outlets at intervals, substantially as herein described.

JAMES E. TOOLE.

Witnesses:
MAX JONAS,
P. P. SMITH.